UNITED STATES PATENT OFFICE.

PHARES BELL, OF CLEVELAND, OHIO.

SLATING COMPOSITION AND METHOD OF PRODUCING THE SAME.

No. 798,006. Specification of Letters Patent. Patented Aug. 22, 1905.

Application filed May 29, 1905. Serial No. 262,933.

*To all whom it may concern:*

Be it known that I, PHARES BELL, a citizen of the United States, residing at Cleveland, in the county of Cuyahoga and State of Ohio, have invented certain new and useful Improvements in Slating Compositions and Method of Producing Same, of which the following is a specification.

My invention relates to an improved slating composition for use in the renovation of blackboards commonly used in educational institutions and elsewhere; and it also relates to the method of compounding the various ingredients to produce the compound; and my said composition is also equally adapted for the manufacture of blackboards the cost whereof will be extremely small as compared with that of blackboards wherein slate is used for the writing-surface.

It is the primary object of my invention to produce a composition which may be easily and quickly applied by means of a brush over the writing-surface of any ordinary blackboard, whether such surface be of slate or other suitable material, and which composition when so applied will dry hard within fifteen minutes after application and will dry with a dead or lusterless finish which is extremely well adapted for writing thereon.

A further object of my invention is to provide a composition of the described character which may be cheaply and quickly manufactured.

The invention consists in the composition and method of producing the same as hereinafter fully described.

My improved composition is composed of the following ingredients in or about in the proportions specified: four gallons wood-alcohol, ninety-seven per cent. pure; one gallon of the highest grade grain-alcohol; five pounds orange shellac; four pounds Eddy's lampblack; seven pounds dark chrome-green, chemically pure; two pounds ultramarine-blue, chemically pure; one-half pound best whiting; one and one-half pounds fine pumice-stone.

In preparing the slating composition with the above ingredients I proceed as follows: I put the shellac in the grain-alcohol and let it dissolve. I then take the pumice-stone, lampblack, chrome-green, ultramarine-blue, and whiting and mix them well together and put the resulting mixture into the wood-alcohol and mix the whole thoroughly. I then take the grain-alcohol containing the dissolved shellac and add the same to the previous mixture of wood-alcohol, pumice-stone, lampblack, chrome-green, ultramarine-blue, and whiting and mix all well together, and the liquid product thus produced is ready for use. It may be readily applied with a brush over the surface of any slate or other blackboard already in use and will produce a hard black lusterless surface within fifteen minutes after being applied, and as a result of such application the writing-surface will be made equal to a new surface, and, in fact, the surface produced by means of this composition is superior to the ordinary slate surface, which latter, as is well known, will soon develop very fine crevices or cracks in the surface, fill up with the crayon-dust, and soon have a dull and whitish appearance.

By the use of my composition I can produce blackboards at a small fraction of the cost of the ordinary slate blackboards by simply coating a wood, plaster, paper, or other surface with one or more coats (usually one) of my improved composition, and the product will be superior in every way to slate.

Furthermore, I can at an extremely small cost renovate a slate blackboard which has become dull and whitish and produce a fine hard surface equal and, in fact, superior to the original slate surface.

I am aware that some of the ingredients used in my composition have been used heretofore in producing compositions for similar purposes; but I have found by repeated experiments that by the use of all the ingredients hereinabove specified in the proportions stated I obtain a composition possessing qualities not attainable by the use of only a portion of the ingredients.

What I claim is—

1. The herein-described composition of matter consisting of wood-alcohol, grain-alcohol, orange shellac, lampblack, chrome-green, ultramarine-blue, whiting and pumice-stone, in or about in the proportions specified.

2. The method of preparing the herein-described composition of matter which consists in dissolving orange shellac in grain-alcohol, then mixing together pumice-stone, lampblack, chrome-green, ultramarine-blue and whiting, and mixing the resulting mixture with wood-alcohol, then adding the last-named mixture to the previous mixture of shellac and grain-alcohol and mixing the whole well together, the proportions of the various ingredients being substantially as set forth.

In testimony whereof I affix my signature in presence of two witnesses.

PHARES BELL.

Witnesses:
   B. H. HERTOG ENOIS,
   H. CARHART SHIMER.